United States Patent

[11] 3,631,951

| [72] | Inventor | Raymond N. Quenneville<br>Suffield, Conn. |
|---|---|---|
| [21] | Appl. No. | 58 |
| [22] | Filed | Jan. 2, 1970 |
| [45] | Patented | Jan. 4, 1972 |
| [73] | Assignee | United Aircraft Corporation<br>East Hartford, Conn. |

[54] DRIVE RELEASED COIL BRAKE WITH A PUMP BRAKE
2 Claims, 4 Drawing Figs.

[52] U.S. Cl. .................................................. 192/8 C,
188/271, 192/4 B
[51] Int. Cl. ..................................................... F16d 67/00
[50] Field of Search .......................................... 192/7, 8, 8
C, 4 B, 12 A, 12; 417/319, 15; 188/271

[56] References Cited
UNITED STATES PATENTS

| Re16,565 | 3/1927 | Myers............................ | 192/8 C |
| 2,775,204 | 12/1956 | Batten et al................... | 417/319 |
| 1,552,697 | 9/1925 | Heintz............................ | 192/8 C |
| 1,687,238 | 10/1928 | Costello ........................ | 192/8 C |
| 1,876,654 | 9/1932 | Floraday ....................... | 192/8 C |

*Primary Examiner*—Benjamin W. Wyche
*Attorney*—Laurence A. Savage

ABSTRACT: A bidirectional locking device for an output shaft which has a load impressed thereon is provided by a single spring means placed between the output shaft and a fixed member for normally locking the output shaft and preventing its rotation in either direction; drive means are operatively connected to the single spring means for unlocking the spring means and for driving the output shaft. A pump brake is driven by the output shaft and retards the shaft by internal fluid resistance when the load is driving the shaft.

INVENTOR
RAYMOND N. QVENNEVILLE

ATTORNEY

DRIVE RELEASED COIL BRAKE WITH A PUMP BRAKE

BACKGROUND OF THE INVENTION

1. Field of the Invention

This invention relates to a load-holding device and particularly to a two-directional locking device which allows an input shaft to drive an output shaft, but which prevents the output shaft load from driving the input shaft in either direction.

2. Description of the Prior Art

Friction disk brakes have been utilized in the past for holding loads. However, such braking system have certain disadvantages. Namely, friction disk brakes are affected by ambient temperature changes, friction coefficient changes and wear of the friction surfaces. To assure that a friction disk brake fulfills the demand of the particular system upon which it is to act, certain objectives must be achieved: the coefficient of friction must be accurately established; this applies to both the absolute value and the maximum variation of static and dynamic values. The values of the coefficient of friction must remain within the predicted range under the influence of all environmental effects. The wear of friction surfaces with use must be minimized to preclude periodic replacement of the brakes, and to prevent introduction of contamination which could adversely affect bearings and gears within the system. Finally, great pains must be taken to assure efficient cooling of the brake surface because if cooling is not properly achieved, the coefficient of friction will in general drop and may remain at the lower level. The heat generated in a friction disk brake, which is holding a shaft upon which is impressed a load attempting to rotate the shaft (when the load is lowered with the friction brake), is not equal to the energy of the lowered load, but is a function of the range of the coefficient of friction. Therefore, the energy which must be dissipated in the friction disk brake can be higher than the actual energy of the lowering load.

Two-directional no-back spring clutches are also known in the art. However, the types known require the use of two springs, one to lock the load in each direction, thereby being unduly complex and of excessive weight.

SUMMARY OF THE INVENTION

One object of the present invention is to provide a bidirectional locking device for an output shaft which utilizes a single spring means to prevent the output shaft from rotating in either direction under the action of a load impressed thereon.

It is another object of the present invention to provide a bidirectional locking device for an output shaft which is capable of releasing an overhauling load in either direction with an input force which is independent of the overhauling load.

It is another object of the present invention to provide a bidirectional locking device for an output shaft which is capable of absorbing the energy of an overhauling load by friction in the single spring means.

It is also an object of the present invention to provide a bidirectional locking device for an output shaft which is capable of absorbing the energy of an overhauling load in a hydraulic pump, and in the event of failure of the hydraulic element, which is also capable of absorbing the energy by friction in the single spring means.

It is another subject of the present invention to provide a bidirectional locking device for an output shaft which does not rely on control of the coefficient of friction range for holding the load and in which the heat energy absorbed in lowering a load is always equal to the energy of the overhauling load itself.

In accordance with the present invention a bidirectional locking device for an output shaft which is adapted to be driven by input drive means and which has a load impressed thereon tending to rotate the output shaft is provided by a single spring means which is engageable with a peripheral surface of the output shaft and a fixed member so as to normally prevent rotation of the output shaft in either direction. Means are provided for releasing the single spring means from its locking relationship with the output shaft. The releasing means is activated by an input drive means so that the output shaft is able to move only in response to motion of the input drive means.

In further accord with the present invention the bidirectional locking device is capable of releasing an overhauling load with an input force which is independent of the overhauling load. In other words, the force exerted by the input drive means to release the single spring means from its locking relationship with the output shaft is independent of the load on the output shaft. Therefore, only a very small force (negligible when compared to the load on the shaft) is needed to release the single spring means.

In still further accord with the present invention, a hydraulic pump is operatively connected to the output shaft for absorbing the energy of an overhauling load. An overhauling load is the load which is impressed on the output shaft. When the load is lowered, it is aiding the input drive means to rotate the output shaft. The energy produced by the lowering load is absorbed by a hydraulic pump in order to reduce the heat that would be generated at the spring means if there were no means for absorbing the energy. The pump operates only when the load is overhauling and not when the input drive means is raising the load.

The foregoing and other objects, features and advantages of the present invention will become more apparent in light of the following detailed description of a preferred embodiment thereof as illustrated in the accompanying drawings.

DESCRIPTION OF THE PREFERRED EMBODIMENT

Figure 1:
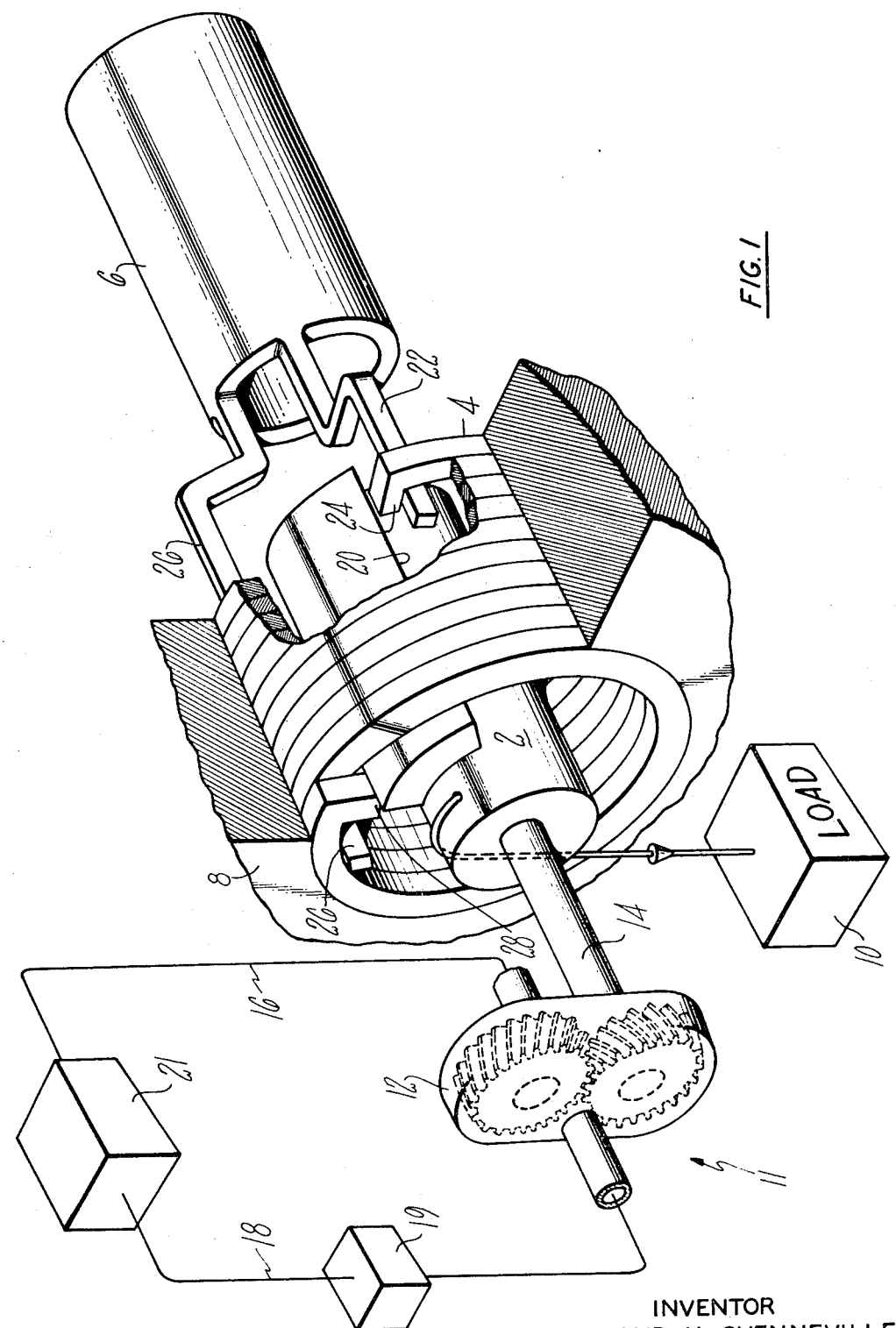
FIG. 1 is a perspective view of one embodiment of a bidirectional locking device in accordance with the present invention.

Referring to FIG. 1, there is shown a rotatable output shaft 2 and single spring means 4 operatively connected to input drive means 6. A fixed member 8 surrounds the spring means 4. A load 10 is impressed on the output shaft 2. It should be noted that while the load is shown simply in schematic form as a weight suspended from a cable wrapped around the output shaft 2, the load could be any force which tends to rotate the output shaft, and it could be a load capable of rotating the output shaft 2 in either direction. A peripheral surface 20 of the output shaft 2 is engageable with the spring means 4.

As is apparent from the drawing, the output shaft 2 cannot rotate under the influence of the load 10 because the peripheral surface 20 of the output shaft engages end 28 of the spring means 4; the greater the load 10, the more the surface 20 pushes against the end of the spring means 4, thereby driving the spring means 4 into a force fit with the fixed member 8 and friction between the spring means 4 and the fixed member 8 locks the load. If the load were reversed, i.e., tending to rotate the shaft 2 in the opposite direction, the same locking process would ensue.

When it is desired to rotate the output shaft 2 to raise or lower the load, the input drive means 6 is rotated in the appropriate direction. For example, when it is desired to lower the load, the input drive means is rotated counterclockwise (as viewed from the output shaft in FIG. 1). Leg 22 of the input drive means will engage the end 24 of the spring means 4 and wind the spring means up, thereby releasing the spring means from its engagement with the fixed member 8; the force of the spring means on the fixed member 8 will thereby be released, and the spring means is free to rotate with the input drive means 6, and thereby to drive the output shaft 2 through the engagement of the end 24 on the peripheral surface 20 of the output shaft 2.

It will also be noted that the load cannot be lowered at a rate faster than that dictated by the input drive means 6 because if the output shaft 2 rotates faster than the spring means 4, the peripheral surface 20 of the output shaft will engage the end 28 of the spring means 4, thereby expanding the spring means, and providing friction braking of the output shaft. The energy of the overhauling load is converted to heat through friction.

To raise the load the input drive means rotates in the clockwise direction (as viewed from the output shaft in FIG. 1). Leg 26 of the input drive means 6 will engage end 28 of the spring means 4 and wind the spring means up, thereby releasing the spring means from its engagement with the fixed member 8. The input drive means is thus able to drive the output shaft 2 through the spring means 4.

Also, the output shaft 2 may be operatively connected to a hydraulic pump unit, shown generally by the numeral 11. The pump 12, connected to the output shaft via shaft 14, may pump hydraulic fluid (not shown) from conduit 16 through the pump 12 and a pressure relief valve 19 or an orifice (not shown) and conduit 18. A heat exchanger 21 may be interposed between the conduit 18 and the conduit 16 if necessary to cool the hydraulic fluid. The pump 12 may be operated only when the load is overhauling, i.e., when the input drive means 6 rotates the output shaft 2 in the direction in which the load impressed on the output shaft tends to rotate the shaft by including a bypass valve (not shown) or the pump may pump fluid in either direction.

The pump converts the energy of the overhauling load directly into a temperature rise in the oil being pumped by the hydraulic pump. By utilizing the pump, the spring means absorbs a minimum of energy and consequently does not suffer from wear or heat generation. However, should the pump fail, the spring means is capable of absorbing the energy by friction. While the pump unit 11 is shown only in FIG. 1, it will be obvious to one skilled in the art that it can be connected to the output shaft in any other embodiment of my invention for a like purpose.

Figure 2:
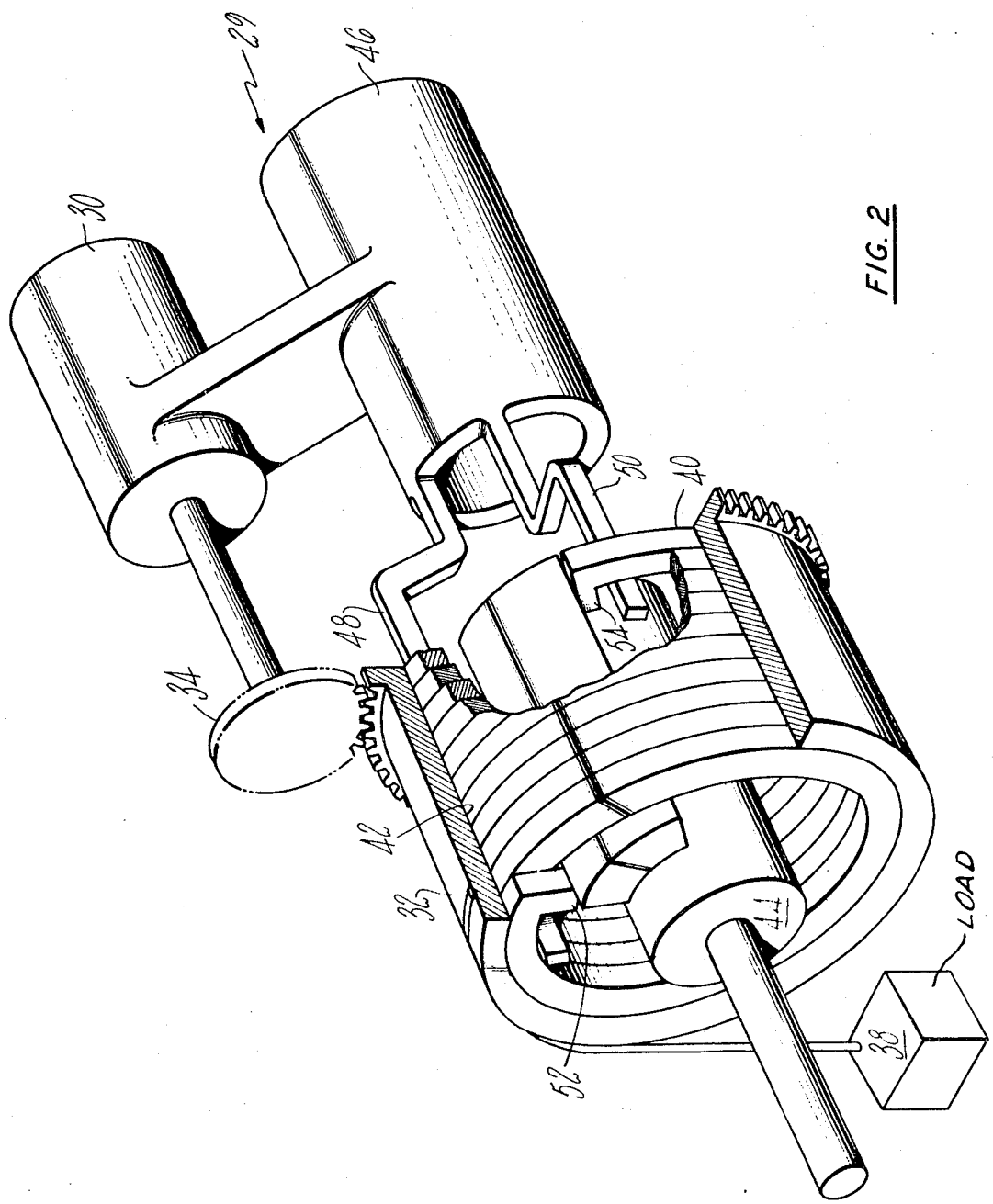
FIG. 2 is a perspective view of another embodiment of a bidirectional locking device in accordance with the present invention.

Referring now to FIG. 2, an input drive means, shown generally by the numeral 29, includes motor means 30 which is adapted to drive an output shaft 32 through a drive gear 34, and a relatively stationary portion 46, explained hereinafter. A load on the output shaft 32 is shown schematically as a weight 38 attached to a cable which is wrapped around the output shaft. Single spring means 40 is disposed between a peripheral surface 42 of the output shaft and a fixed member 44. The relatively stationary portion 46 of the input drive means 29 has legs 48 and 50 engageable with ends 52 and 54, respectively, of spring means 40. The relatively stationary portion 46 may be operatively connected to the casing of the motor means 30 so that the reaction torque of the motor means 30 rotates the relatively stationary portion 46 to unlock the spring means and permit the motor means 30 to drive the output shaft 32. In this embodiment the spring means does not rotate.

Figure 3:
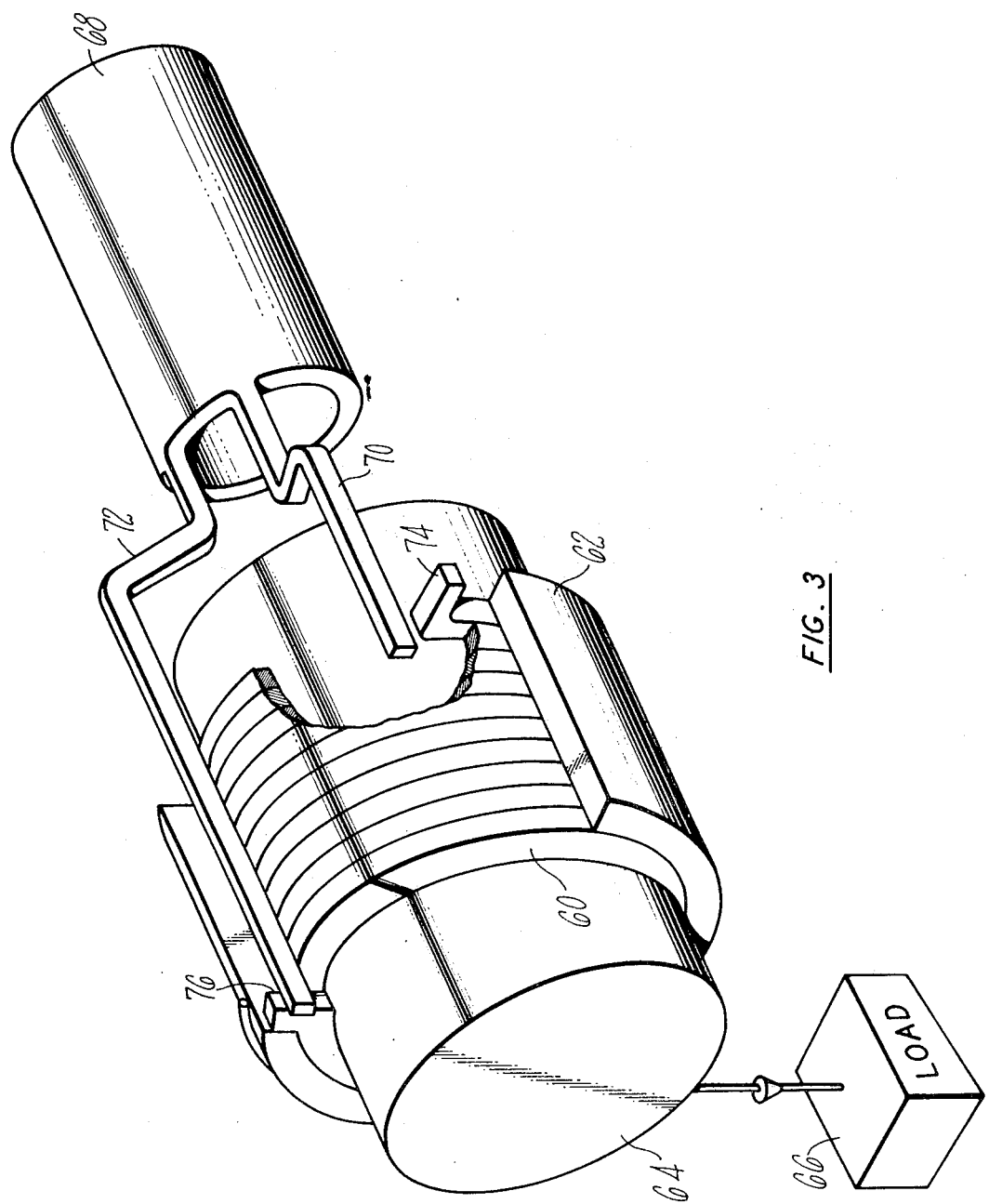
FIG. 3 is a perspective view of a third embodiment of a bidirectional locking device in accordance with the present invention.

FIG. 3 shows another embodiment of the invention. A single spring means 60 is disposed between an output shaft 62 and a fixed member 64. A load 66 impressed on the output shaft 62 is shown schematically as a weight attached to a cable wrapped around the output shaft. The input drive means 68 has legs 70 and 72 engageable with ends 74 and 76, respectively, of the spring means 60. To lower the load, for example, the input drive means 68 rotates counterclockwise (when viewed from the output shaft in FIG. 3). The leg 72 will engage the end 76 of the spring means 60 and uncoil the spring means, thereby releasing the friction force between the spring means 60 and the fixed member 64. The input drive means 68 is then able to drive the output shaft 62 through the spring which rotates therewith. To raise the load, the reverse of the above would take place.

Figure 4:
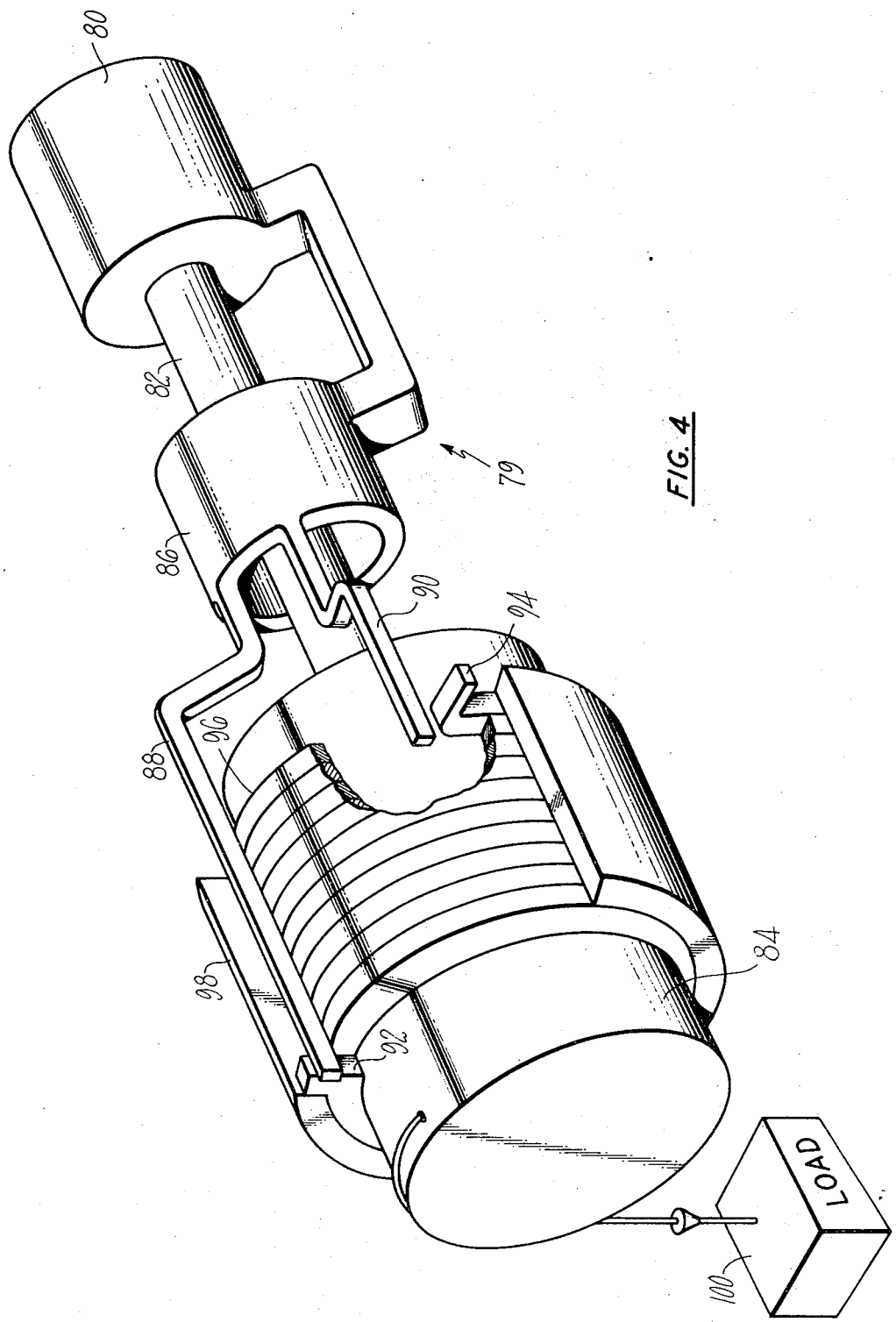
FIG. 4 is a perspective view of a fourth embodiment of a bidirectional locking device in accordance with the present invention.

In FIG. 4 there is shown generally an input drive means 79 including motor means 80 having a drive shaft 82 which may be integral with the output shaft 84. A relatively stationary portion 86 is operatively connected to the motor means 80 and has legs 88 and 90 which are engageable with the ends 92 and 94 of the single spring means 96, respectively. The single spring means is disposed between the output shaft 84 and a fixed member 98. A load impressed on the output shaft is shown schematically as a load 100 suspended by a cable wrapped around the output shaft 84. To raise the load, the drive shaft 82 of the motor means 80 is rotated clockwise (as viewed from the output shaft in FIG. 4). The relatively stationary portion 86 will rotate counterclockwise because it is operatively connected to the housing of the motor means, and the reaction torque of the motor means will cause it to rotate in the opposite direction of the output shaft 82. The leg 88 will engage the end 92 of the spring means 96 and release the locking force of the spring means on the output shaft 84 thereby allowing the output shaft to rotate in a clockwise direction. To lower the load, the reverse of the above would take place.

There have thus been described embodiments of my invention. I wish it to be understood, however, that I do not desire to be limited to the exact details of construction shown and described, for obvious modifications will occur to a person skilled in the art.

What I claim as new and desire to secure by Letters Patent of the United States is:

1. A bidirectional locking device for an output shaft is adapted to be driven by an input drive means, and which has a load impressed thereon tending to rotate the output shaft, comprising:

a fixed member;

single coil spring means surrounding and engageable with a peripheral surface of said output shaft with said fixed member, said spring means normally locking said output shaft and thereby preventing its rotation in either direction;

releasing means for releasing said spring means from its locking relationship with said output shaft and said fixed member, said releasing means releasing said spring means in response to a signal from said input drive means whereby said output shaft rotates in either direction only in response to movement of said input drive means; and a pump operatively connected to said output shaft and adapted to be driven thereby in response to rotation of said output shaft by said input drive means, whereby said pump absorbs the energy of the overhauling load.

2. A bidirectional locking device for an output shaft which is adapted to be driven by an input drive means, and which has a load impressed thereon tending to rotate the output shaft, comprising:

a fixed member disposed adjacent said output shaft and spaced therefrom;

single coil spring means disposed between said fixed member and said output shaft and engageable with a peripheral surface of said output shaft and with said fixed member for normally locking said output shaft and thereby preventing its rotation in either direction;

input drive means operatively connected to said single coil spring means for releasing said single coil spring means from its locking relationship with said output shaft and said fixed member whereby said output shaft rotates only in response to motion of said input drive means;

a pump operatively connected to said output shaft and adapted to be driven thereby in response to rotation of said output shaft by said input drive means, whereby said pump absorbs the energy of the overhauling load.

* * * * *